(12) United States Patent
Ki et al.

(10) Patent No.: US 11,914,533 B2
(45) Date of Patent: Feb. 27, 2024

(54) SYSTEMS AND METHODS FOR DATA PREFETCHING FOR LOW LATENCY DATA READ FROM A REMOTE SERVER

(71) Applicant: Samsung Electronics Co., Ltd., Suwon-si (KR)

(72) Inventors: Yang Seok Ki, Palo Alto, CA (US); Sang Hun Jun, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/939,944

(22) Filed: Sep. 7, 2022

(65) Prior Publication Data
US 2024/0028530 A1 Jan. 25, 2024

Related U.S. Application Data

(60) Provisional application No. 63/390,618, filed on Jul. 19, 2022.

(51) Int. Cl.
*G06F 12/00* (2006.01)
*G06F 13/16* (2006.01)
*G06F 15/173* (2006.01)
*G06F 12/1018* (2016.01)
*G06F 12/02* (2006.01)

(52) U.S. Cl.
CPC ...... *G06F 13/1689* (2013.01); *G06F 12/0238* (2013.01); *G06F 12/1018* (2013.01); *G06F 15/17331* (2013.01)

(58) Field of Classification Search
CPC ............. G06F 12/0238; G06F 12/1018; G06F 15/17331
See application file for complete search history.

(56) References Cited

U.S. PATENT DOCUMENTS

| 8,874,842 | B1 | 10/2014 | Kimmel et al. |
| 10,303,646 | B2 | 5/2019 | Das et al. |
| 10,375,167 | B2 | 8/2019 | Shamis et al. |
| 10,732,836 | B2 | 8/2020 | Shi et al. |

(Continued)

FOREIGN PATENT DOCUMENTS

EP 3938882 A1 1/2022

OTHER PUBLICATIONS

Dong, Kangping et al., "Exploiting RDMA for Distributed Low-Latency Key/Value Store on Non-volatile Main Memory," 2017 IEEE 23rd International Conference on Parallel and Distributed Systems (ICPADS), 2017, pp. 225-231.

(Continued)

*Primary Examiner* — Arvind Talukdar
(74) *Attorney, Agent, or Firm* — Renaissance IP Law Group LLP

(57) ABSTRACT

A system is disclosed. The system may include a first device including a first processor, and a second device including a second processor, a memory, a first storage, and a second storage. The first storage may operate at a first speed, and the second storage may operate at a second speed that is slower than the first speed. The second device may be remote relative to the first device. The first device may load a metadata from a memory address in the memory of the second device. The first device may also access a data from the second device based at least in part on the metadata in the memory of the second device.

17 Claims, 11 Drawing Sheets

(56) References Cited

U.S. PATENT DOCUMENTS

| | | |
|---|---|---|
| 10,733,137 B2 | 8/2020 | Kachare et al. |
| 10,769,098 B2 | 9/2020 | Joshua et al. |
| 11,144,465 B2 | 10/2021 | He et al. |
| 11,210,230 B2 | 12/2021 | Faibish et al. |
| 2010/0083247 A1* | 4/2010 | Kanevsky ............ G06F 9/45558 718/1 |
| 2016/0308968 A1* | 10/2016 | Friedman ............. G06F 12/0813 |
| 2018/0341429 A1* | 11/2018 | Bolkhovitin ............ G06F 3/067 |
| 2018/0341653 A1* | 11/2018 | Teotia ................ G06F 15/17331 |
| 2020/0371914 A1 | 11/2020 | Wang et al. |
| 2021/0011623 A1 | 1/2021 | Fay et al. |
| 2021/0342071 A1 | 11/2021 | Puhov et al. |

OTHER PUBLICATIONS

Lu, Youyou et al., "Octopus: An RDMA-Enabled Distributed Persistent Memory File System," 2017 USENIX Annual Technical Conference (USENIX ATC 17), 2017, pp. 773-785.

* cited by examiner

SYSTEMS AND METHODS FOR DATA PREFETCHING FOR LOW LATENCY DATA READ FROM A REMOTE SERVER

RELATED APPLICATION DATA

This application claims the benefit of U.S. Provisional Patent Application Ser. No. 63/390,618, filed Jul. 19, 2022, which is incorporated by reference herein for all purposes.

FIELD

The disclosure relates generally to databases, and more particularly to accelerating data retrieval from a remote server.

BACKGROUND

Storage requirements tend to increase over time. As storage devices become larger, the amount of data to be stored increases as well. The more data there is to read from a storage device, the more time may be required to read all the appropriate data. Reading the data may cause computational loads to increase (as the processor may be waiting on various threads while data is read). If the storage device is remotely located, these computational loads may be further increased by the time required to read the data from the remote location.

A need remains for a way to expedite data retrieval from remote servers.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

SUMMARY

Figure 1:
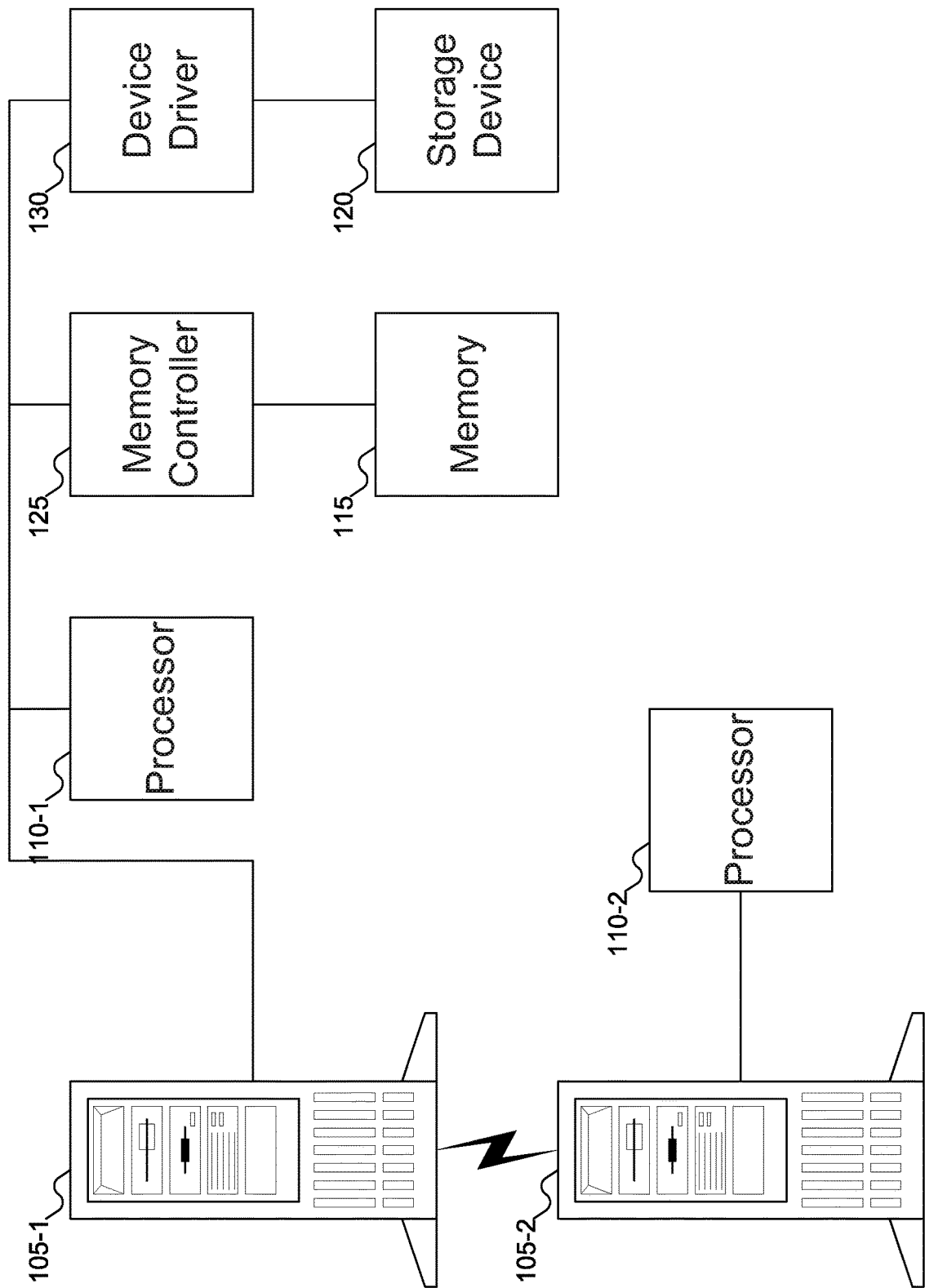
FIG. 1 shows a system two machines in communication, with one machine reading data from the other machine, according to embodiments of the disclosure.

Embodiments of the disclosure include a system. The system may include a database server and a storage server. The database server may remotely access metadata from the storage server and may use the metadata to determine whether to remotely access the data or to issue a network socket request to the storage server for the data.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Database servers might not store the data they process locally. Instead, the data might be stored on a remote server.

Issuing a request to read data from a remote server may involve sending a request via a network socket. The storage server, upon receiving the request, may use a hash table to determine where the data is currently located. Possible data locations may include dynamic random access memory (DRAM), persistent memory (PMEM), or various storage devices, such as Solid State Drives (SSDs) or hard disk drives, among other possibilities.

Each type of storage device—DRAM, PMEM, SSD, or hard disk drive—may offer different levels of performance and cost. For example, DRAM may be the fastest form of storage, but also the most expensive type of storage. Hard disk drives, on the other hand, may be relatively slow, but may offer the most storage per unit of cost (that is, the least expensive type of storage).

Depending on where the data is located, the storage server may load the data from its current location into DRAM (or some faster form of storage than the storage device where the data is currently located), then send the data back to the database server. By storing the data in a faster form of storage, the storage server may be prepared to respond more rapidly to future requests to access the data.

But the time required, from when the database server issues the request to read the data until the storage server returns the data to the database server, may be relatively long: for example, approximately 200 microseconds (vs). This delay might not appear large, but multiplied by numerous read requests, might become significant. As the database server is paused while waiting for data to be retrieved, it is desirable to avoid or minimize such delay.

Embodiments of the disclosure address this problem by having the database server access the hash table of the storage server using a remote access command: for example, a remote direct memory access (RDMA) command. From the information in the hash table, the database server may determine where the data is currently stored. If the data is currently stored in DRAM or PMEM, the database server may use another remote access command to retrieve the data. As remote access commands may be relatively faster than read requests issued via a network socket, the database server may be able to retrieve the data more rapidly using remote access commands.

In addition, the storage server may recognize when the hash table has been accessed via a remote access command by the database server. If the data whose location is specified in the hash table is currently on a slower storage device, such as a hard disk drive or an SSD, the storage server may move the data into a faster storage device, such as PMEM or DRAM, to enable the database server to access the data more rapidly.

FIG. 1 shows a system including two machines communicating with each other, according to embodiments of the disclosure. In FIG. 1, machine 105-1 may be a storage server, and machine 105-2 may be a database server. Database server 105-2 may access data from storage server 105-1. (Machines 105-1 and 105-2 may be referred to collectively as machines 105: machines 105 may also be referred to as hosts or systems.) Storage server 105-1 may include processor 110-1, and database server 105-2 may include processor 110-2. (Processors 110-1 and 110-2 may be referred to collectively as processors 110.) Storage server 105-1 may also include memory 115 and storage device 120 (database machine 105-2, which not shown as including memory 115, storage device 120, or any other components, may also include such components). Processors 110 may be any variety of processor. (Processors 110, along with the other components discussed below, are shown outside the machine for ease of illustration: embodiments of the disclosure may include these components within the machine.) While FIG. 1 shows machines 105 as each including a single processor 110, machines 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110-1 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

In some embodiments of the disclosure, machines 105 may include a persistent memory device (not shown in FIG. 1). This persistent memory device may be used in place of, or in addition to, memory 115.

Processor 110 and memory 115 may also support an operating system under which various applications may be running. These applications may issue requests (which may also be termed commands) to read data from or write data to either memory 115. When storage device 120 are used to support applications reading or writing data via some sort of file system, storage devices 120 may be accessed using device driver 130. While FIG. 1 shows one storage device 120, there may be any number of storage devices in machines 105. Storage devices 120 may each support any desired protocol or protocols, including, for example, the Non-Volatile Memory Express (NVMe) protocol. Different storage devices 120 may support different protocols and/or interfaces. For example, storage device 120 might support a cache coherent interconnect protocol, which may support both block level (or any other higher level of granularity) access and byte level (or any other lower level of granularity) access to data on storage devices 120. An example of such a cache coherent interconnect protocol is the Compute Express Link (CXL) protocol, which supports accessing data in blocks using the cxl.io protocol and accessing data in bytes using the cxl.memory protocol. In this manner, data on a CXL storage device may be accessed as either block level data (like an SSD) or byte level data (such as a memory): the CXL storage device may be used to extend the system memory.

FIG. 1 uses the generic term "storage device", and embodiments of the disclosure may include any storage device formats that may support cache coherent interconnect protocols, examples of which may include hard disk drives and Solid State Drives (SSDs). Any reference to "SSD", "hard disk drive", or "storage device" below should be understood to include such other embodiments of the disclosure. Further, different types of storage devices may be mixed. For example, one storage device 120 might be a hard disk drive, and another storage device 120 might be an SSD.

Not shown in FIG. 1 are circuit boards. These circuit boards, which may be a motherboard, backplane, or midplane, may include slots into which processors 110, memory 115, and/or storage device 120 may be installed. Note that depending on the implementation, one or more of these components may be installed directly onto the circuit board, rather than being installed in slots. In addition, embodiments of the disclosure may include multiple circuit boards that interconnect, with the components installed across these circuit boards.

Figure 2:
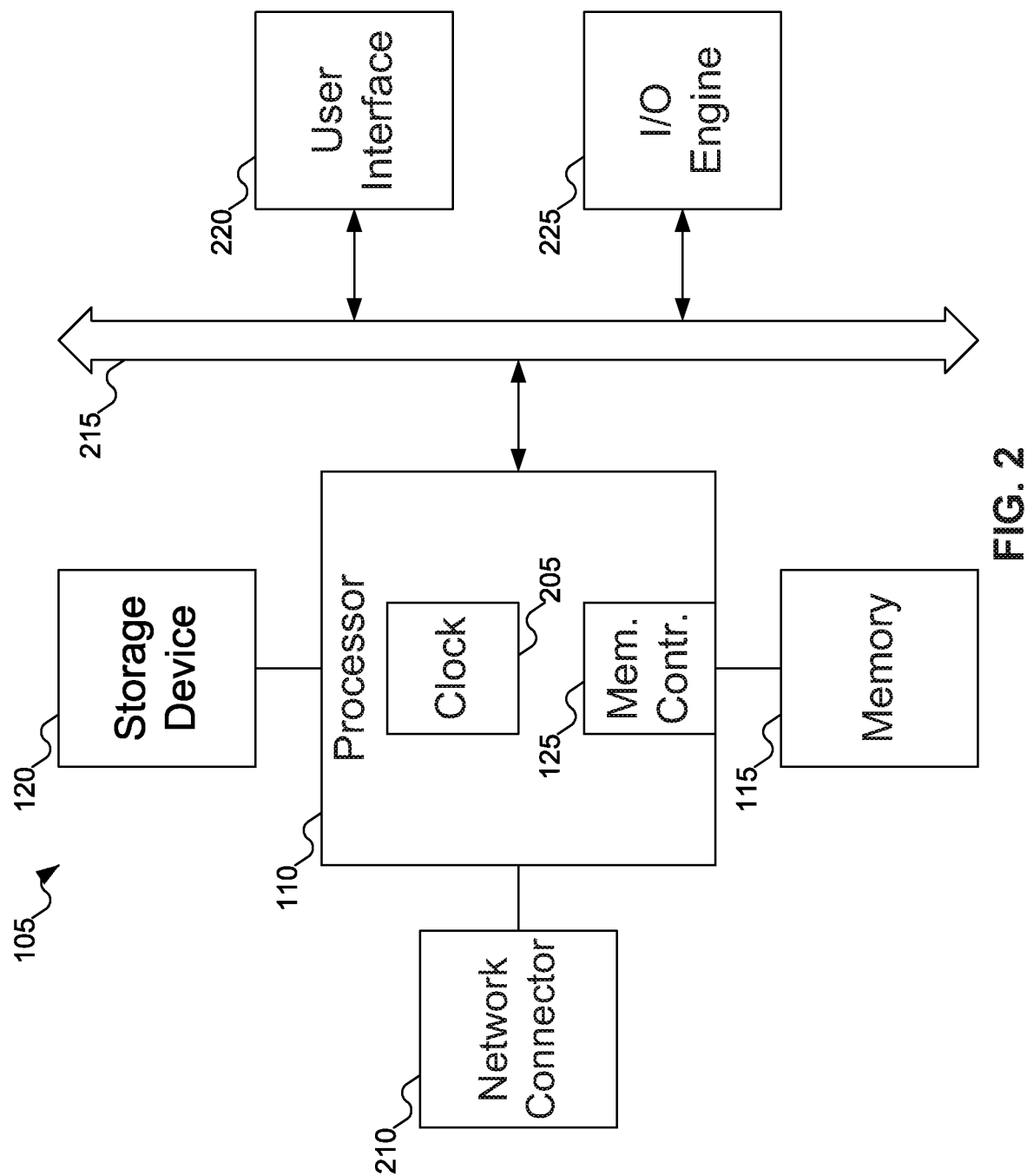
FIG. 2 shows details of the machines of FIG. 1, according to embodiments of the disclosure.

FIG. 2 shows details of machines 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
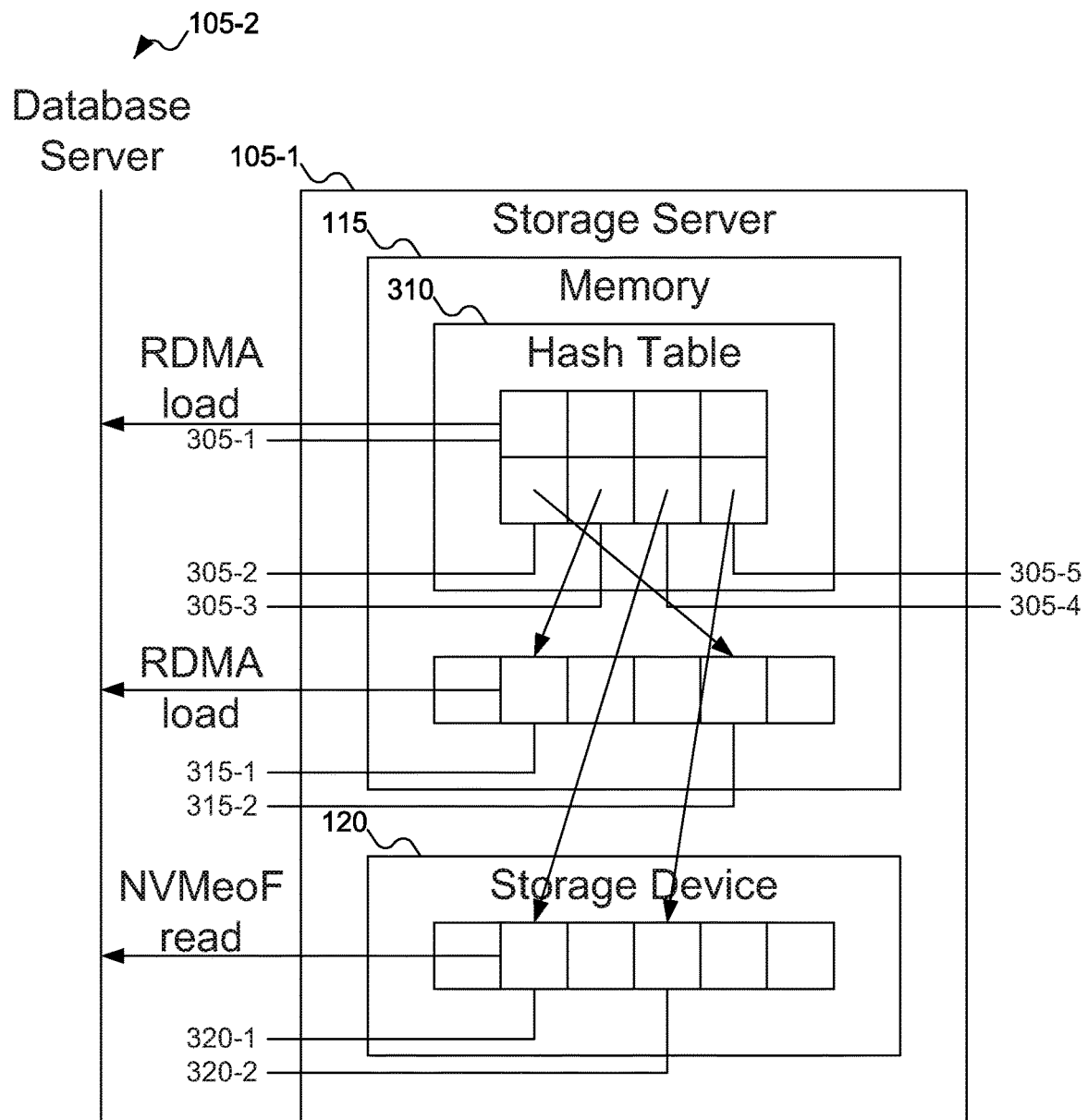
FIG. 3 shows the database server of FIG. 1 accessing data from the storage server of FIG. 1, according to embodiments of the disclosure.

FIG. 3 shows database server 105-2 of FIG. 1 accessing data from storage server 105-1 of FIG. 1, according to embodiments of the disclosure. In FIG. 3, database server 105-2 may perform a load of metadata from memory 115 in storage server 105-1. More specifically, database server 105-2 may load entry 305-1 (which may also be called metadata 305-1) from hash table 310 that may be stored in memory 115 of storage server 105-1. In other words, entry 305-1 may store metadata about the data that is sought.

Entry 305-1 may be one of any number of entries in hash table 310. For example, hash table 310 may include entries 305-1 through 305-5 (which may be referred to collectively as entries 305 or metadata 305). While FIG. 3 shows hash table 310 as including eight entries 305, embodiments of the disclosure may support any number of entries 305 in hash table 310.

Each entry may identify where a particular chunk of data is stored. For example, storage server 105-1 might include memory 115 and storage device 120. Entries 305 may identify which device currently stores a particular data, as well as the address on that device where the data is currently stored. For example, entries 305-2 and 305-3 may indicate that data 315-1 or 315-2 are stored at memory addresses in memory 115 (which may be a different part of memory 115 from hash table 310), while entries 305-4 and 305-5 may indicate that the data blocks 320-1 or 320-2 are stored in blocks of storage device 120.

Figure 4:
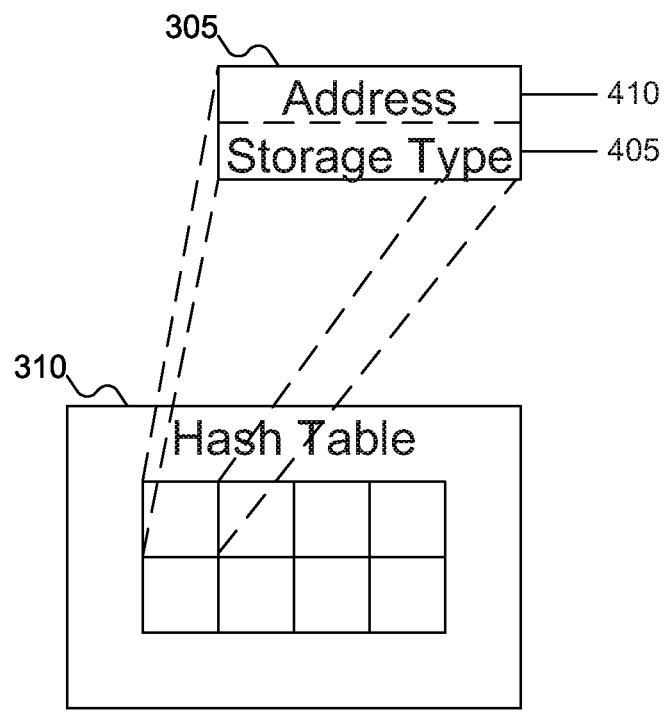
FIG. 4 shows data that may be stored in the hash table of FIG. 3, according to embodiments of the disclosure.

FIG. 4 shows data that may be stored in hash table 310 of FIG. 3, according to embodiments of the disclosure. In FIG. 4, entry 305 is shown in greater detail as including storage type 405 and address 410. Storage type 405 may identify the type of device storing the data. For example, a few bits may be used to identify the device, based on the number of devices in storage server 105-1 of FIG. 1. Alternatively (or additionally), storage type 405 may identify whether the type of device storing the data is a "fast storage" or a "slow storage". "Fast storage" and "slow storage" are discussed further with reference to FIG. 6 below.

Returning to FIG. 3, because entry 305-1 may be stored in memory 115, database server 105-2 may access entry 305-1 using a remote memory access call, such as a remote direct memory access (RDMA) load request. Such a request may provide database server 105-2 with the data (or metadata) in entry 305-1 without processor 110-1 of FIG. 1 of storage server 105-1 needing to use any processor cycles to process the request. In the remainder of this document, the terms "RDMA command", "RDMA request", and the like are intended to refer to any remote access command or request, whether using RDMA or another type of command. Likewise, in the remainder of this document, reference to a storage device "operating" at a speed is intended to mean that the storage device is capable of returning data at that speed. Thus, if three storage devices are said to "operate" at 800 MB/second, 500 MB/second, and 300 MB/second respectively, the second storage device may be described as "slow storage" relative to the first storage device, but as "fast storage" relative to the third storage device.

Once database server 105-2 knows which device stores the data in question, database 105-2 may access the data in an appropriate manner. For example, if the metadata indicates that the data in question is stored somewhere in memory 115, database server 105-2 may access the data using another remote memory access call: again, possibly an RDMA load request. Thus, database server 105-2 might issue an RDMA load request to access data 315-1 or 315-2 from memory 115. On the other hand, if the metadata indicates that the data in question is stored on a flash storage device, database server 105-2 may access the data using a different request: for example, a non-volatile memory express over fabric (NVMeoF) read request. Thus, database server 105-2 might issue an NVMeoF read request to access data 320-1 or 320-2. If the data is stored on a storage device that is slower to access remotely, database server 105-2 might also opt to issue a network socket request to read the data from storage server 105-1, rather than performing a remote access of the data.

An advantage of using the technique described herein is that database server 105-2 may receive the data more quickly than using a convention access request through a network socket. Using a network socket request, processor 110-1 of FIG. 1 of storage server 105-1 may be involved. The network socket request might take, for example, 20 microseconds ($\mu s$) to be received and processed: if processor 110-1 of FIG. 1 is currently busy, the network socket request may wait even longer to be processed. Then, storage server 105-1 may access entry 305-1 to determine where the data is stored, retrieve the data from the device where it is stored, and return the data to database server 105-2. If the data is stored in a cache on a flash storage device, it might take another 40 $\mu s$ for storage server 105-1 to retrieve the data and send it back to database server 105-2. Add in another 100 $\mu s$ for the network socket read to complete, and it might take a total of 200 $\mu s$ to retrieve and return the data to database server 105-2. If the data is stored on a slower storage device, such as a hard disk drive, the total time to complete the read request might be even longer. But if database server 105-2 is able to access entry 305-1 directly and then retrieve the data from the storage device directly, the time involved might be less. For example, performing an RDMA load request to retrieve entry 305-1 might take only 1 $\mu s$, and performing an RDMA load request to retrieve the data from a cache on a flash storage device might take another 100 vs. Since the total time involved to directly access the data might be only 101 $\mu s$, the time required might be only ½ of the time required to retrieve the data using a network socket request.

Even if the data is stored on a slower storage device—for example, a hard disk drive—and database server 105-2 opts to use a network socket request to read the data from storage server 105-1, the added time spent attempting to directly access the data might not be a significant delay. For example, if it only takes 1 $\mu s$ to access data 315-1 from a memory address in memory 115, then the total time to access the data using a network socket request after attempting the direct access would be only 1 $\mu s$ longer than just issuing the network socket request directly. If the network socket request takes, for example, 200 $\mu s$ to complete and give database server 105-2 access to the data, the added delay may represent only 0.5% additional time.

While FIG. 3 shows entries 305 pointing to locations in memory 115 or storage device 120, embodiments of the disclosure may have entries 305 indicate that the data may be stored in other locations as well. For example, if storage device 120 is an SSD and storage server 105-1 also includes a persistent memory device and a hard disk drive, then entries 305 might point to any of these four devices to identify where the data is stored.

One point that has not yet been discussed is how database server 105 may know which entry 305 includes information about where data 315 or 320 is stored. In some embodiments of the disclosure, the structure of hash table 310 may be known to database server 105-2. It does not matter if the structure of hash table 310 is determined statically or dynamically: as long as database server 105-2 knows how hash table 310 is structured, database server 105-2 may be able to issue a remote memory access request to read the appropriate entry 305 from hash table 310. Put another way, knowing an identifier of a particular data 315 or 320, database server 105-2 may replicate the hash function performed by storage server 105-1 on that identifier and determine the hash bucket that may store information about where that data 315 or 320 is actually stored on storage server 105-1. Database server 105-2 may then know what entry 305 to access from hash table 310 and access it directly using a remote memory access request.

Note as well that each entry 305 in hash table 310 may identify where a chunk of data of a known size may be stored. For example, data 315 or 320 may each be approximately 8 kilobytes (KB) in size. If database server 105-2 performs a remote memory access request from memory 110 or a storage device read request from storage device 120, the request may access the entire 8 KB chunk, from which database server 105-2 may then access the particular data of interest.

Figure 5:
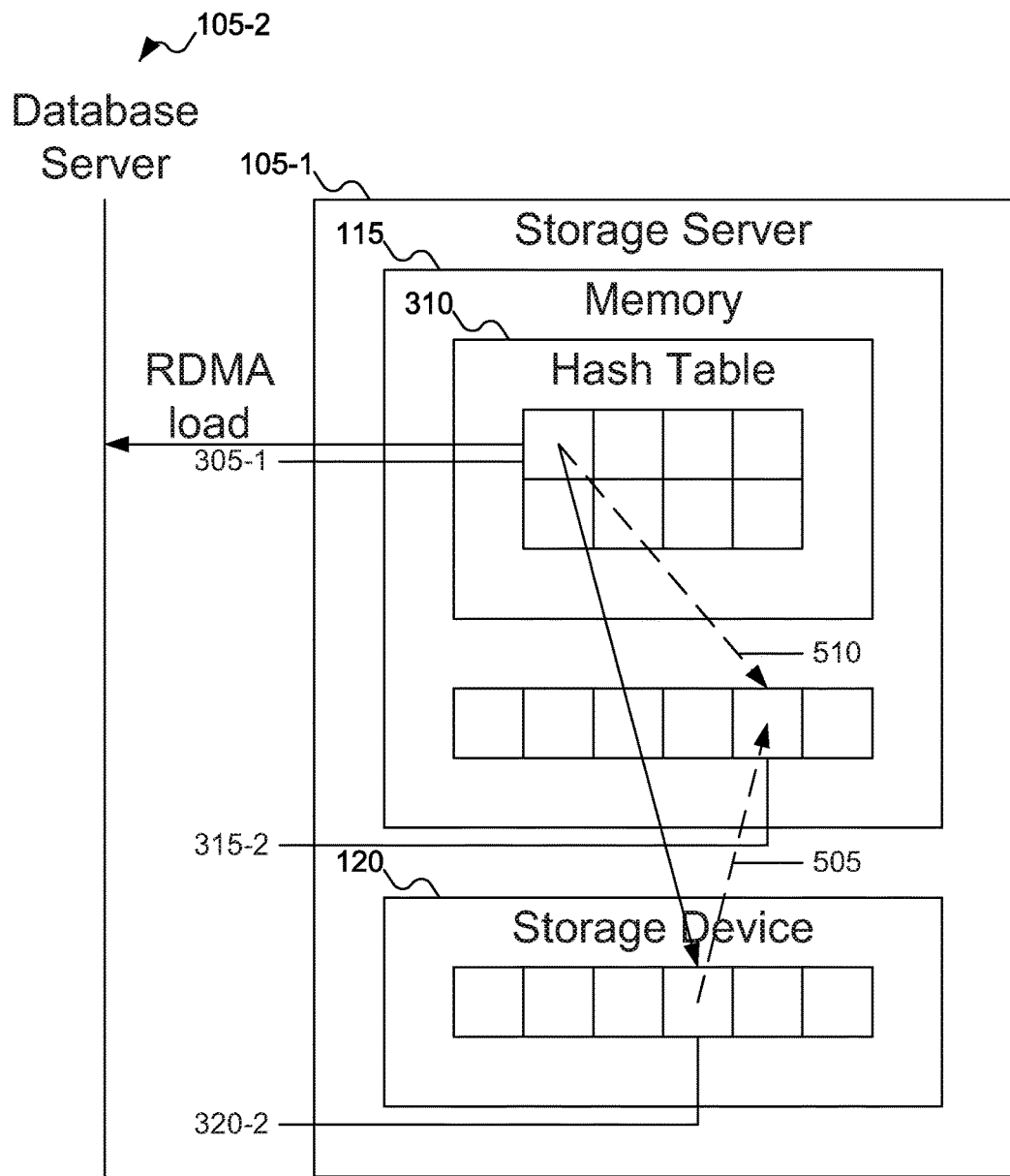
FIG. 5 shows the storage server of FIG. 1 copying data for future access by the database server of FIG. 1, according to embodiments of the disclosure.

FIG. 5 shows storage server 105-1 of FIG. 1 copying data for future access by database server 105-2 of FIG. 1, according to embodiments of the disclosure. When database server 105-2 issues a remote memory access request, such as an RDMA load request, storage server 105-1 may detect this request. While storage server 105-1 might not need to perform any processing while the remote memory access occurs, storage server 105-1 might take some actions to expedite future requests. For example, as shown in FIG. 5, entry 305-1 might indicate that the data 320-2 in a block on storage device 120. Storage device 120 might be a relatively slow storage device, and storage server 105-1 might expect that database server 105-2 may issue a network socket request to access that data. In anticipation of that network socket request, storage server 105-1 might copy the data 320-2 from the block on storage device 120 as data 315-2 into a memory address in memory 115, as shown by dashed line 505. Storage server 105-1 might also update entry 305-1 to reflect that data 320-2 is now available as data 315-2 in memory 115, as shown by dashed line 510 (this information might replace or might supplement the original metadata in entry 305-1). As memory 115 may be relatively faster to access than storage device 120, when storage server 105-1 receives the network socket request from database server 105-2, storage server 105-1 may be able to respond to the network socket request more rapidly (since the data 315-2 might be read more rapidly from memory 115 than data 320-2 might be read from storage device 120).

There are other reasons for copying data from relatively slower storage devices to faster storage devices as well. One additional reason might be that if database server 105-2 wants to access the data once, database server 105-2 might want to access the data again. By copying the data into memory 115 (or some relatively faster storage device), database server 105-2 might be able to remotely access the data more quickly in the future.

Another reason to copy data from relatively slower storage devices to relatively faster storage devices might be in anticipation of database server 105-2 wanting to access the data, even though no such access request has yet been made. For example, database server 105-2 might want to access a large amount of data. If storage server 105-1 stores this data sequentially on storage device 120, storage server 105-1 might copy an adjacent data into memory 115, in anticipation that database server 105-2 might want to access that data as well.

Figure 6:
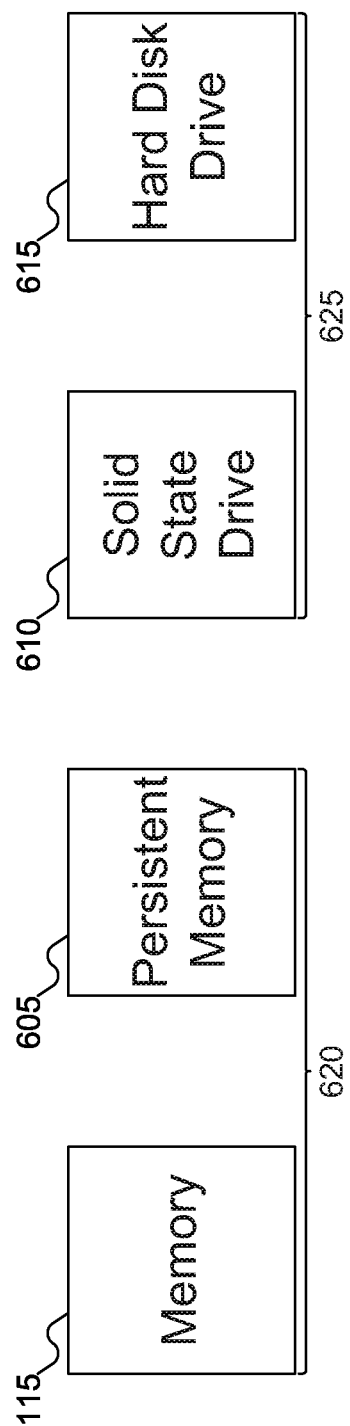
FIG. 6 shows various forms of storage that may be used in the storage server of FIG. 1, according to embodiments of the disclosure.

FIG. 6 shows various forms of storage that may be used in storage server 105-1 of FIG. 1, according to embodiments of the disclosure. In FIG. 6, four types of storage are shown: memory 115, persistent memory 605, SSD 610, and hard disk drive 615. While FIG. 6 shows only four types of storage, embodiments of the disclosure may include any number of different types of storage. Storage server 105-1 of FIG. 1 may include any combination of these forms of storage, including all of them.

In general, there may be an inverse relationship between the speed of a form of storage and its cost per unit of storage. For example, memory 115, which may be DRAM, may be the fastest form of storage shown in FIG. 6. (Faster forms of storage may also exist, such as a processor cache, with the same general principle applying.) But with an average cost in 2022 of $4-$5 per gigabyte (GB), DRAM may also be considered relatively expensive. SSD 610, on the other hand, may be slower than memory 115, but at an average cost in 2022 of $0.10-$0.20 per GB, it is possible to purchase 20 times (or more) the storage as an SSD than DRAM. Hard disk drive 615, which may be slower than SSD 610, may be even cheaper still, with an average cost in 2022 of $0.03-$0.05 per GB.

Persistent memory 605 may be implemented in a number of ways. One form that persistent memory 605 may take is described in U.S. patent application Ser. No. 17/858,058, filed Jul. 5, 2022, now pending, which claims the benefit of U.S. Provisional Patent Application Ser. No. 63/340,437, filed May 10, 2022 and U.S. Provisional Patent Application Ser. No. 63/314,361, filed Feb. 25, 2022, all of which are incorporated herein by reference for all purposes. In embodiments of the disclosure using persistent memory as described in that patent application, the response time may be expected on average to be between that of DRAM and that of an SSD (as that form of persistent memory includes both DRAM and an SSD), and the average cost per GB may be expected to be between that of DRAM and SSD, consistent with the general principle that faster storage may be more expensive per GB.

Also shown in FIG. 6 is that the various forms of storage may be classified as either fast storage 620 or slow storage 625. The terms "fast storage" and "slow storage" should be understood to be relative terminology rather than being based on absolute response times. That is, a particular form of storage might be considered "fast" in some implementations of embodiments of the disclosure, and might be considered "slow" in other implementations of embodiments of the disclosure. Put yet another way, there is no "line" that may be drawn, either between forms of storage or based on some threshold response time, that distinguishes "fast storage" from "slow storage". As an alternative, the "fast storage" may be a form of storage that may return more data in a unit of time than the "slow storage" may return in that same unit of time: or alternatively, that for a given amount of data, the "fast storage" may return the data in less time than the "slow storage".

In FIG. 6, memory 115 and persistent memory 605 are considered fast storage 620, and SSD 610 and hard disk drive 615 are considered slow storage 625. The distinction between fast storage 620 and slow storage 625 may be thought of as distinguishing between storage that database server 105-2 of FIG. 1 might access directly (using, for example, an RDMA load request or an NVMeoF read request) sufficiently faster than a network socket request and storage that might not be accessed sufficiently faster than a network socket request. For example, memory 115 and persistent memory 605 may be accessed in a fast enough manner that database server 105-2 of FIG. 1 may access the desired data faster than using a network socket request (and hence "fast storage" 620). On the other hand, SSD 610 and hard disk drive 615 might take long enough to return the data that there is insufficient benefit to directly accessing the data as compared with a network socket request, or for which no faster access is possible, such as a storage that does not support remote access (and hence "slow storage" 625).

Figure 7:
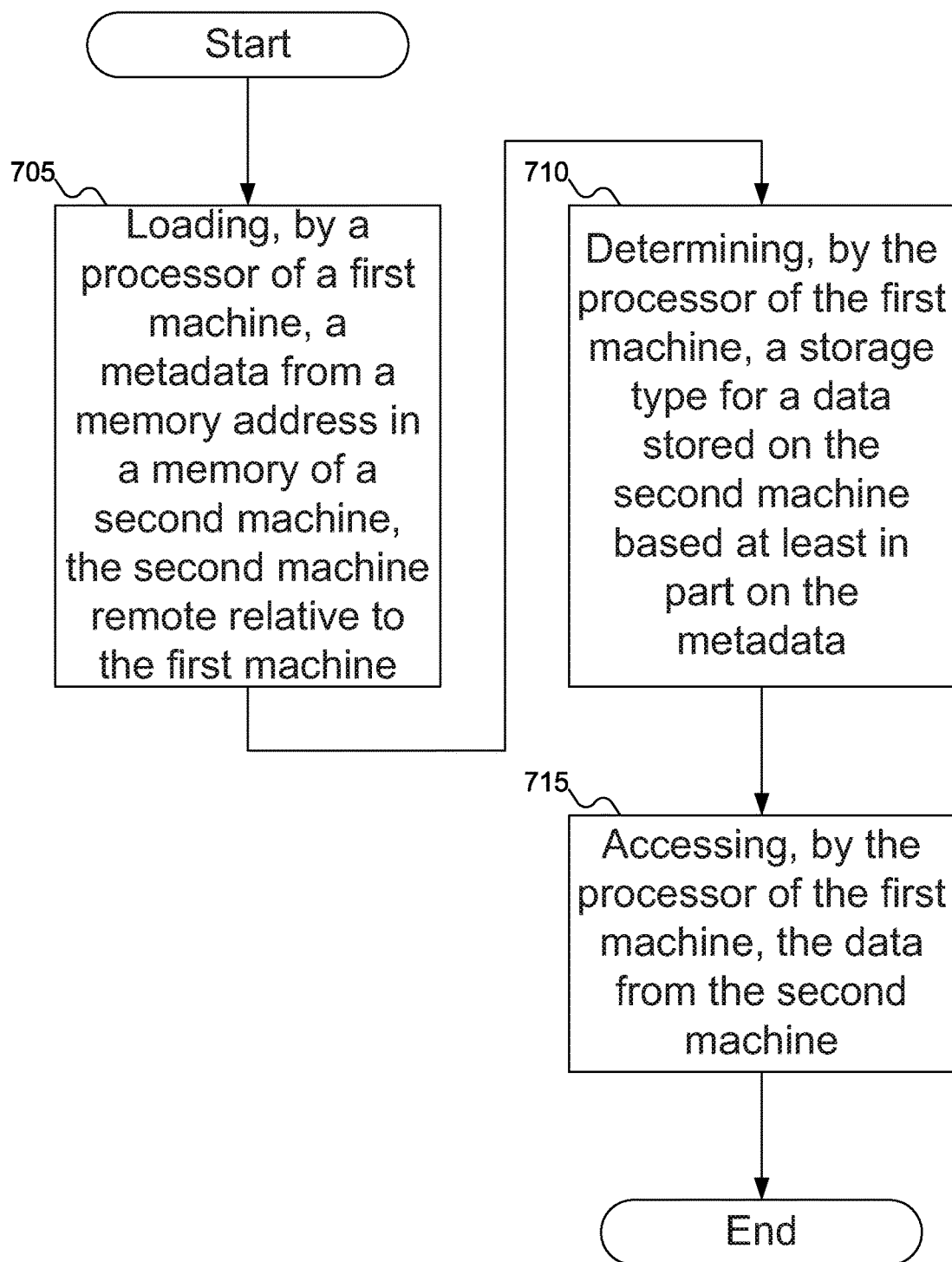
FIG. 7 shows a flowchart of an example procedure for the database server of FIG. 1 to access data from the storage server of FIG. 1, according to embodiments of the disclosure.

FIG. 7 shows a flowchart of an example procedure for database server 105-2 of FIG. 1 to access data from storage server 105-1 of FIG. 1, according to embodiments of the disclosure. In FIG. 7, at block 705, database server 105-2 of FIG. 1 may load metadata 305-1 of FIG. 3 from memory 115 of FIG. 1 of storage server 105-1 of FIG. 1. At block 710, database server 105-2 of FIG. 1 may determine storage type 405 of FIG. 4 from metadata 305-1 of FIG. 3, which may identify what type or form of storage currently stores the data of interest. Finally, at block 715, database server 105-2 of FIG. 1 may access data 315 or 320 of FIG. 3 from the appropriate storage 115, 605, 610, or 615 of FIG. 6 where the data is stored on storage server 105-1 of FIG. 1.

Figure 8:
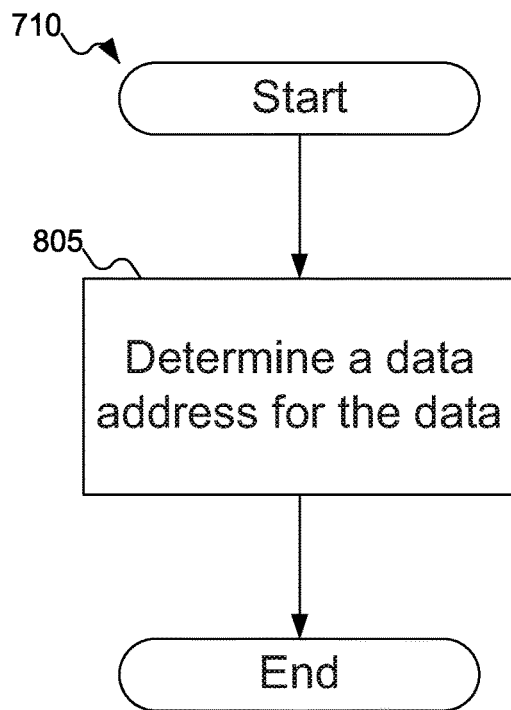
FIG. 8 shows a flowchart of an example procedure for the database server of FIG. 1 to determine the address of data on the storage server of FIG. 1, according to embodiments of the disclosure.

FIG. 8 shows a flowchart of an example procedure for database server 105-2 of FIG. 1 to determine the address of data on storage server 105-1 of FIG. 1, according to embodiments of the disclosure. In FIG. 8, at block 805, database server 105-2 of FIG. 1 may determine address 410 of FIG. 4 for data 315 or 320 of FIG. 3 from metadata 305 of FIG. 3.

Figure 9:
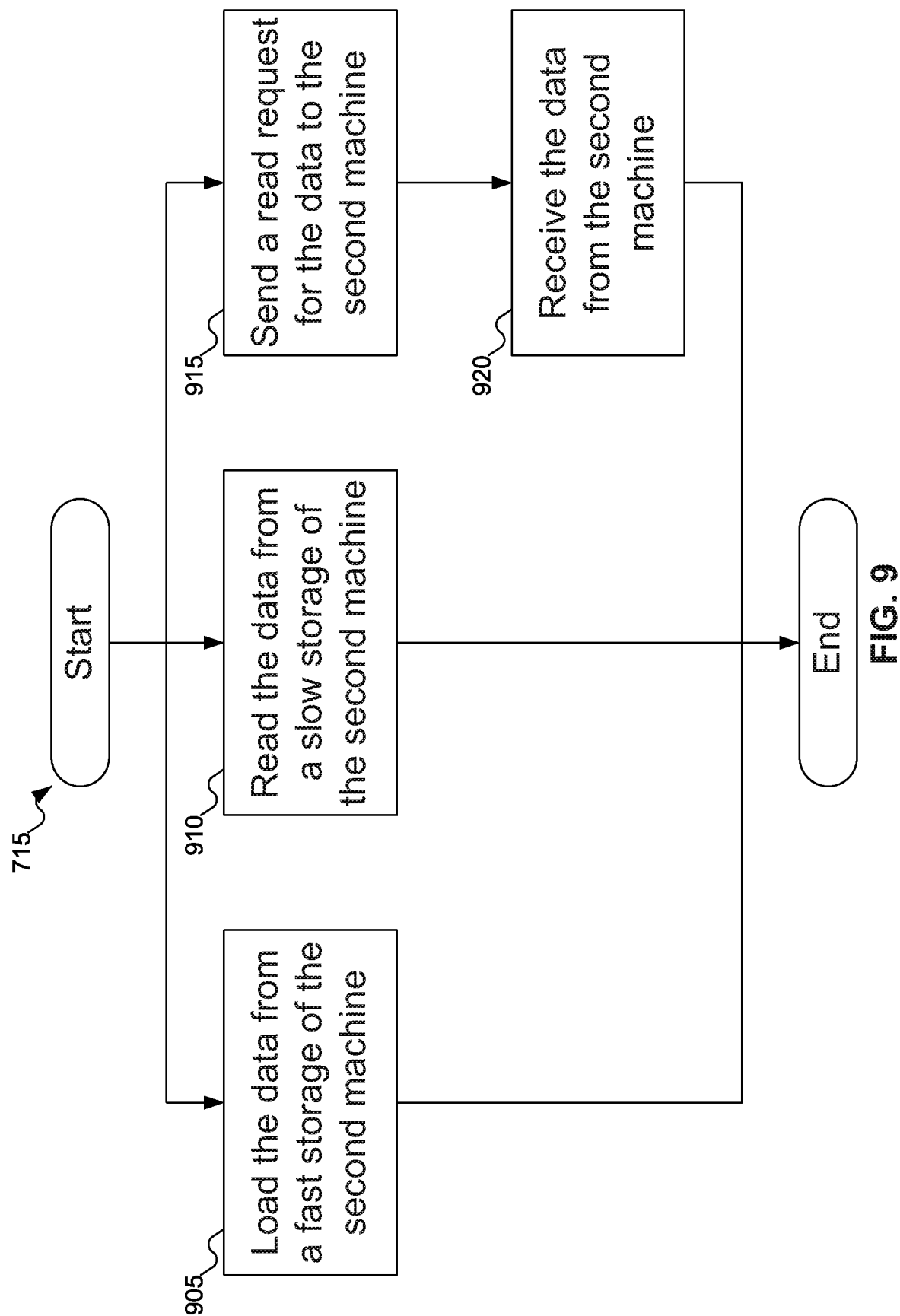
FIG. 9 shows a flowchart of an example procedure for the database server of FIG. 1 to access data from the storage server of FIG. 1, according to embodiments of the disclosure.

FIG. 9 shows a flowchart of an example procedure for database server 105-2 of FIG. 1 to access data from storage server 105-1 of FIG. 1, according to embodiments of the disclosure. In FIG. 9, at block 905, database server 105-2 of FIG. 1 may load data 315 of FIG. 3 from fast storage 620 of FIG. 6 from storage server 105-1 of FIG. 1. Alternatively, at block 910, database server 105-2 of FIG. 1 may read data 320 of FIG. 3 from slow storage 625 of FIG. 6. Alternatively, at block 915, database server 105-2 of FIG. 1 may send a network socket request for data 315 or 320 of FIG. 3 to storage server 105-1 of FIG. 1, and at block 920 database server 105-2 of FIG. 1 may receive data 315 or 320 of FIG. 3 from storage server 105-1 of FIG. 1.

Figure 10:
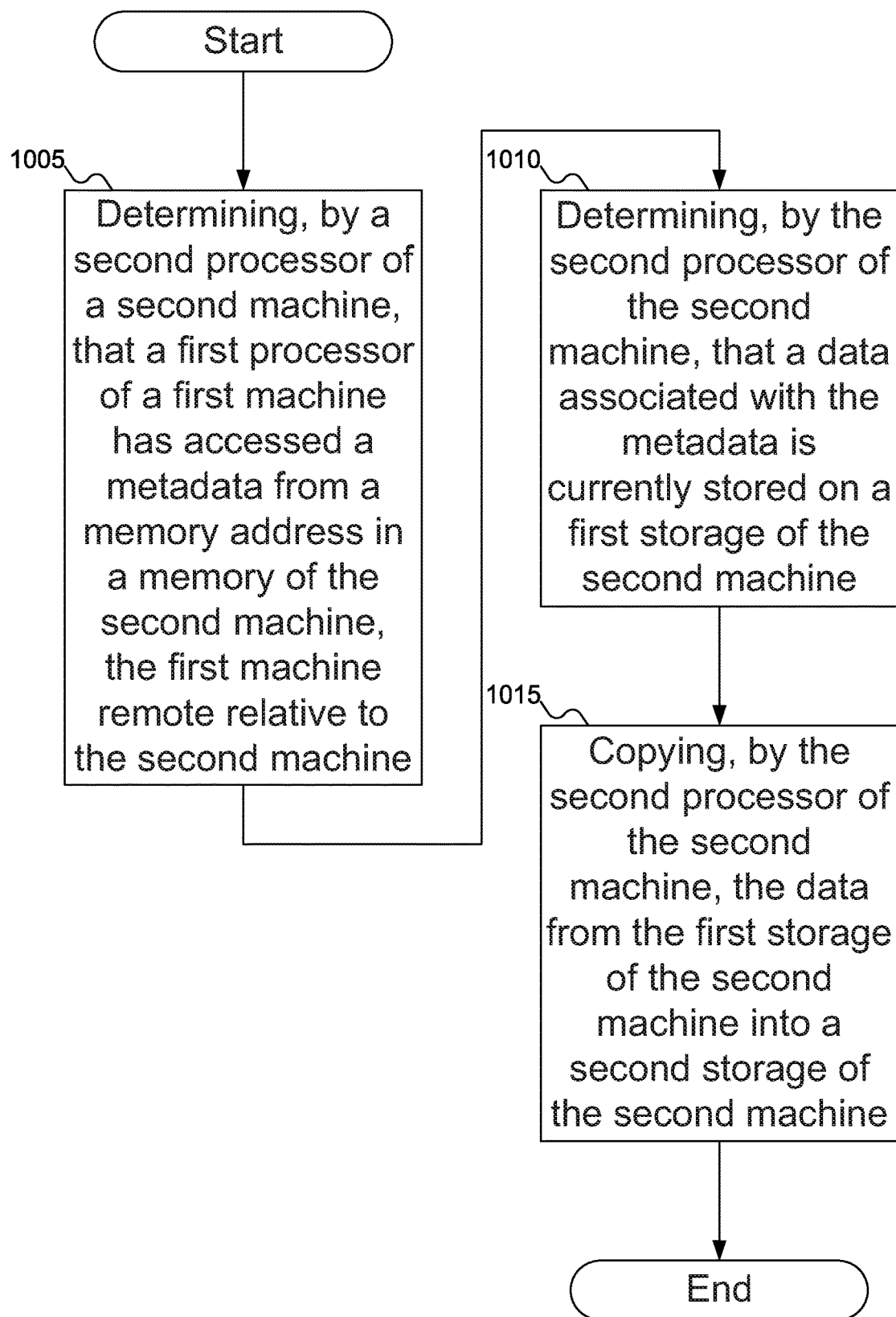
FIG. 10 shows a flowchart of an example procedure for the storage server of FIG. 1 to copy data between forms of storage, according to embodiments of the disclosure.

FIG. 10 shows a flowchart of an example procedure for storage server 105-1 of FIG. 1 to copy data between forms of storage, according to embodiments of the disclosure. In FIG. 10, at block 1005, storage server 105-1 of FIG. 1 may determine that database server 105-2 of FIG. 1 has accessed metadata 305 of FIG. 3 from memory 115 of FIG. 1 from storage server 105-1 of FIG. 1. At block 1010, storage server 105-1 of FIG. 1 may determine that data 320 of FIG. 3 is currently on slow storage 625 of FIG. 6, and at block 1015 storage server 105-1 of FIG. 1 may copy data 320 of FIG. 3 from slow storage 625 of FIG. 6 to data 315 of FIG. 3 in fast storage 620 of FIG. 6, in anticipation of a future access of data 315 of FIG. 3 by database server 105-2 of FIG. 1.

Figure 11:
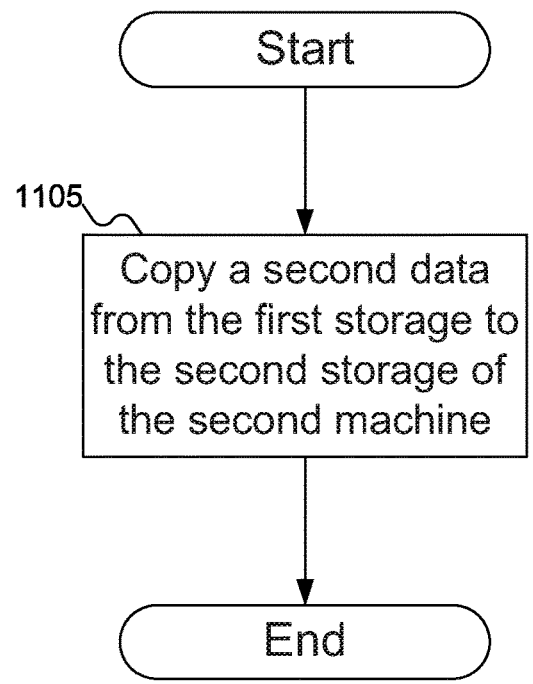
FIG. 11 shows a flowchart of an example procedure for the storage server of FIG. 1 to copy data between forms of storage, according to embodiments of the disclosure.

FIG. 11 shows a flowchart of an example procedure for storage server 105-1 of FIG. 1 to copy data between forms of storage, according to embodiments of the disclosure. In FIG. 11, based on database server 105-2 of FIG. 1 having accessed another data 320 of FIG. 3 from slow storage 625 of FIG. 6 on storage server 105-1 of FIG. 1, storage server 105-1 of FIG. 1 may also copy another data 320 of FIG. 3 from slow storage 625 of FIG. 6 on storage server 105-1 of FIG. 1 to data 315 of FIG. 3 in fast storage 620 of FIG. 6 on storage server 105-1 of FIG. 1, in anticipation of a future access of data 315 of FIG. 3 by database server 105-2 of FIG. 1.

In FIGS. 7-11, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure may include a database server remotely accessing metadata from a storage server. The metadata may identify where a particular data is located. The database server may then remotely access the data, rather than requesting the storage server to access and return the data using a network socket request. Because directly accessing data from the storage server may be faster than using a network socket request, embodiments of the disclosure provide a technical advantage of faster access to the data by the database server, which may enable faster processing of the data.

Embodiments of the disclosure includes using Remote Direct Memory Access (RDMA) over Converged Ethernet (RoCE) to access data to reduce latency with persistent memory (PMEM).

Embodiments of the disclosure may include a system that has a data server and a storage server. The systems may maintain various types of memory (e.g., persistent memory, flash cache, volatile memory, etc.). For example, a predetermined size of memory (e.g., approximately an 8 KB block) may be used to store data in Dynamic Random Access Memory (DRAM), flash, or persistent memory in the system. If stored in DRAM, the data may be read directly into memory using RDMA. Embodiments of the disclosure may include having two RDMA operations to access the data. The first operation may include reading a hash table on the storage server to calculate which bucket of DRAM to use. The system may thereby load data into the data server, which checks the bucket to see if the data block is cached or not and determines the type of memory on which the data block is stored (e.g., persistent memory, flash, or cache). Thus, the first operation may obtain metadata information (e.g., the address of the data block). The second operation may use RDMA to read the actual data from the persistent memory.

When the database server accesses the storage server using RDMA, there may be two operations as noted. The first operation may include reading a bucket from a hash table and the second operation may include reading the data from the storage server. Using the proposed systems, a more efficient technique is described that may reduce the system latency. Since the system uses both DRAM and NAND, it may be ideal to read data from DRAM, since reading data from persistent memory can take a relatively longer amount of time.

To mitigate this situation, embodiments of the disclosure may leverage the behavior of the storage server via the two operations to read metadata and to use the metadata to prefetch some data from persistent memory. First, the storage server may access data within a range (e.g., located in the persistent memory) and may parse data in a monitored memory space. The memory prefetcher may parse information (e.g., retrieve address information). Once the memory prefetcher identifies a data block in the persistent memory area, the prefetcher may transfer the data from NAND to DRAM for ease of access. Thus, embodiments of the disclosure may include prefetching a small amount of guaranteed data: some memory may be over provisioned but some are accessed with certainty. Thus, the approach may incur a penalty, but since some data blocks are expected to be accessed very soon, the unaccessed ones can be evicted immediately. If memory pressure occurs, the system may be configured to evict the unaccessed data blocks first, for example.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:
 a first device, the first device including a first processor; and
 a second device, the second device including a second processor, a memory, a first storage that operates at a first speed, and a second storage that operates at a second speed, wherein the second speed is slower than the first speed,
 wherein the second device is remote relative to the first device, wherein the first device is configured to load a metadata from a memory address in the memory of the second device, and wherein the first device is configured to access a data from the second device based at least in part on the metadata in the memory of the second device.

Statement 2. An embodiment of the disclosure includes the system according to statement 1, wherein memory of the second device is configured to store a hash table, the hash table including the memory address.

Statement 3. An embodiment of the disclosure includes the system according to statement 1, wherein:

the first storage includes at least one of a Solid State Drive (SSD) or a hard disk drive; and the second storage includes at least one of the memory or a persistent memory.

Statement 4. An embodiment of the disclosure includes the system according to statement 1, wherein the first device is further configured to load the metadata from the memory address in the memory of the second device with the second processor of the second device performing any operations to support loading the metadata from the memory address in the memory of the second device by the first processor of the first device.

Statement 5. An embodiment of the disclosure includes the system according to statement 1, wherein the metadata in the memory of the second device includes a storage type for the data.

Statement 6. An embodiment of the disclosure includes the system according to statement 5, wherein the storage type identifies at least one of the first storage or the second storage.

Statement 7. An embodiment of the disclosure includes the system according to statement 1, wherein the first device is configured to load the metadata from the memory address in the memory of the second device based at least in part on a remote direct memory access (RDMA).

Statement 8. An embodiment of the disclosure includes the system according to statement 1, wherein the first device is further configured to load the data from the first storage of the second device based at least in part on the metadata in the memory of the second device.

Statement 9. An embodiment of the disclosure includes the system according to statement 8, wherein the first device is further configured to load the data from the first storage of the second device based at least in part on a storage type in the metadata in the memory of the second device identifying the first storage and a data address in the metadata in the memory of the second device.

Statement 10. An embodiment of the disclosure includes the system according to statement 8, wherein the first storage of the second device includes the memory of the second device.

Statement 11. An embodiment of the disclosure includes the system according to statement 1, wherein the first device is further configured to read the data from the second storage of the second device based at least in part on the metadata in the memory of the second device.

Statement 12. An embodiment of the disclosure includes the system according to statement 11, wherein the first device is further configured to read the data from the second storage of the second device based at least in part on a storage type in the metadata in the memory of the second device identifying the second storage and a data address in the metadata in the memory of the second device.

Statement 13. An embodiment of the disclosure includes the system according to statement 11, wherein the first device is further configured to read the data from the second storage of the second device without the second processor of the second device performing any operations to support reading the data from the second storage of the second device by the first processor of the first device.

Statement 14. An embodiment of the disclosure includes the system according to statement 11, wherein the first device is further configured to read the data from the second storage device of the second device using a non-volatile memory express over fabric (NVMeoF) request.

Statement 15. An embodiment of the disclosure includes the system according to statement 1, wherein the first device is further configured to send a read request to the second device based at least in part on the metadata in the memory of the second device.

Statement 16. An embodiment of the disclosure includes the system according to statement 15, wherein the first device is further configured to send a read request to the second device based at least in part on a storage type in the metadata in the memory of the second device identifying the second storage.

Statement 17. An embodiment of the disclosure includes the system according to statement 1, wherein the second device is configured to copy the data from the second storage of the second device to the first storage of the second device based at least in part on the first device loading the metadata from the memory address in the memory of the second device.

Statement 18. An embodiment of the disclosure includes the system according to statement 17, wherein the second device is further configured to update the metadata in the memory of the second device based at least in part on copying the data from the second storage of the second device to the first storage of the second device.

Statement 19. An embodiment of the disclosure includes the system according to statement 17, wherein the second device is configured to copy a second data from the second storage of the second device to the first storage of the second device based at least in part on the first device loading the metadata from the memory address in the memory of the second device.

Statement 20. An embodiment of the disclosure includes the system according to statement 19, wherein the second device is further configured to update a second metadata in the memory of the second device based at least in part on copying the second data from the second storage of the second device to the first storage of the second device.

Statement 21. An embodiment of the disclosure includes a method, comprising:

loading, by a processor of a first device, a metadata from a memory address in a memory of a second device, the second device remote relative to the first device;

determining, by the processor of the first device, a storage type for a data stored on the second device based at least in part on the metadata; and accessing, by the processor of the first device, the data from the second device.

Statement 22. An embodiment of the disclosure includes the method according to statement 21, wherein loading, by the processor of the first device, the metadata from the memory address in the memory of the second device includes loading, by the processor of the first device, the metadata from the memory address in a hash table in the memory of the second device.

Statement 23. An embodiment of the disclosure includes the method according to statement 21, wherein a structure of the hash table is known to the first device and the second device.

Statement 24. An embodiment of the disclosure includes the method according to statement 21, wherein loading, by the processor of the first device, the metadata from the memory address in the memory of the second device includes loading, by the processor of the first device, the metadata from the memory address in the memory of the second device without a second processor of the second device performing any operations to support loading the metadata from the memory address in the hash table of the memory of the second device by the processor of the first device.

Statement 25. An embodiment of the disclosure includes the method according to statement 21, wherein determining, by the processor of the first device, the storage type for the data stored on the second device based at least in part on the metadata includes determining, by the processor of the first device, that the storage type is a first storage type, wherein the first storage type operates at a first speed that is faster than a second speed of a second storage type.

Statement 26. An embodiment of the disclosure includes the method according to statement 25, wherein accessing, by the processor of the first device, the data from the second device includes loading, by the processor of the first device, the data from a first storage of the second device.

Statement 27. An embodiment of the disclosure includes the method according to statement 26, wherein loading, by the processor of the first device, the data from a first storage of the second device includes loading, by the processor of the first device, the data from a first storage of the second device based at least in part on a remote direct memory access (RDMA).

Statement 28. An embodiment of the disclosure includes the method according to statement 26, wherein the first storage of the second device includes at least one of the memory of the second device or a persistent memory of the second device.

Statement 29. An embodiment of the disclosure includes the method according to statement 26, wherein determining, by the processor of the first device, the storage type for the data stored on the second device based at least in part on the metadata further includes determining a data address for the data on the first storage of the second device.

Statement 30. An embodiment of the disclosure includes the method according to statement 29, wherein loading, by the processor of the first device, the data from the first storage of the second device includes loading, by the processor of the first device, the data from the data address on the first storage of the second device.

Statement 31. An embodiment of the disclosure includes the method according to statement 21, wherein determining, by the processor of the first device, the storage type for the data stored on the second device based at least in part on the metadata includes determining, by the processor of the first device, that the storage type is a second storage wherein the second storage type operates at a second speed that is slower than a first speed of a first storage.

Statement 32. An embodiment of the disclosure includes the method according to statement 31, wherein accessing, by the processor of the first device, the data from the second device includes reading, by the processor of the first device, the data from a second storage of the second device.

Statement 33. An embodiment of the disclosure includes the method according to statement 32, wherein the second storage of the second device includes at least one of a Solid State Drive (SSD) of the second device or a hard disk drive of the second device.

Statement 34. An embodiment of the disclosure includes the method according to statement 32, wherein reading, by the processor of the first device, the data from the second storage of the second device includes reading, by the processor of the first device, the data from the second storage of the second device without a second processor of the second device performing any operations to support reading, by the processor of the first device, the data from the second storage of the second device.

Statement 35. An embodiment of the disclosure includes the method according to statement 32, wherein reading, by the processor of the first device, the data from the second storage of the second device includes reading, by the processor of the first device, the data from the second storage of the second device using a non-volatile memory express over fabric (NVMeoF) request.

Statement 36. An embodiment of the disclosure includes the method according to statement 32, wherein determining, by the processor of the first device, the storage type for the data stored on the second device based at least in part on the metadata further includes determining a data address for the data on the second storage of the second device.

Statement 37. An embodiment of the disclosure includes the method according to statement 36, wherein reading, by the processor of the first device, the data from the second storage of the second device includes reading, by the processor of the first device, the data from the data address on the second storage of the second device.

Statement 38. An embodiment of the disclosure includes the method according to statement 31, wherein accessing, by the processor of the first device, the data from the second device includes sending a read request for the data to the second device.

Statement 39. An embodiment of the disclosure includes the method according to statement 38, wherein accessing, by the processor of the first device, the data from the second device further includes receiving the data from the second device.

Statement 40. An embodiment of the disclosure includes a method, comprising:
  determining, by a first processor of a first device, that a second processor of a second device has accessed a metadata from a memory address in a memory of the first device, the second device remote relative to the first device;
  determining, by the first processor of the first device, that a data associated with the metadata is currently stored on a first storage of the first device; and
  copying, by the first processor of the first device, the data from the first storage of the first device into a second storage of the first device.

Statement 41. An embodiment of the disclosure includes the method according to statement 40, wherein:
  the first storage includes a second storage type that operates at a first speed; and
  the second storage includes a first storage type that operates at a second speed,
  wherein the first speed is slower than the second speed.

Statement 42. An embodiment of the disclosure includes the method according to statement 40, wherein:
  the first storage includes at least one of a Solid State Drive (SSD) or a hard disk drive; and
  the second storage includes at least one of the memory or a persistent memory.

Statement 43. An embodiment of the disclosure includes the method according to statement 40, wherein determining, by the first processor of the first device, that the second processor of the second device has accessed the metadata from the memory address in the memory of the first device includes determining, by the first processor of the first device, that the second processor of the second device has accessed the metadata from the memory address in a hash table in the memory of the first device.

Statement 44. An embodiment of the disclosure includes the method according to statement 40, wherein determining, by the first processor of the first device, that the second processor of the second device has accessed the metadata from the memory address in the memory of the first device includes detecting, by the first processor of the first device, a remote direct memory access (RDMA) of the memory address in the memory of the first device by the second processor of the second device.

Statement 45. An embodiment of the disclosure includes the method according to statement 40, further comprising copying, by the first processor of the first device, a second data from the first storage of the first device into the second storage of the first device.

Statement 46. An embodiment of the disclosure includes an article, comprising a non-transitory storage medium, the non-transitory storage medium having stored thereon instructions that, when executed by a device, result in:
  loading, by a processor of a first device, a metadata from a memory address in a memory of a second device, the second device remote relative to the first device;
  determining, by the processor of the first device, a storage type for a data stored on the second device based at least in part on the metadata; and
  accessing, by the processor of the first device, the data from the second device.

Statement 47. An embodiment of the disclosure includes the article according to statement 46, wherein loading, by the processor of the first device, the metadata from the memory address in the memory of the second device includes loading, by the processor of the first device, the metadata from the memory address in a hash table in the memory of the second device.

Statement 48. An embodiment of the disclosure includes the article according to statement 46, wherein a structure of the hash table is known to the first device and the second device.

Statement 49. An embodiment of the disclosure includes the article according to statement 46, wherein loading, by the processor of the first device, the metadata from the memory address in the memory of the second device includes loading, by the processor of the first device, the metadata from the memory address in the memory of the second device without a second processor of the second device performing any operations to support loading the metadata from the memory address in the hash table of the memory of the second device by the processor of the first device.

Statement 50. An embodiment of the disclosure includes the article according to statement 46, wherein determining, by the processor of the first device, the storage type for the data stored on the second device based at least in part on the metadata includes determining, by the processor of the first device, that the storage type is a first storage type, wherein the first storage type operates at a first speed that is faster than a second speed of a second storage type.

Statement 51. An embodiment of the disclosure includes the article according to statement 50, wherein accessing, by the processor of the first device, the data from the second device includes loading, by the processor of the first device, the data from a first storage of the second device.

Statement 52. An embodiment of the disclosure includes the article according to statement 51, wherein loading, by the processor of the first device, the data from a first storage of the second device includes loading, by the processor of the first device, the data from a first storage of the second device based at least in part on a remote direct memory access (RDMA).

Statement 53. An embodiment of the disclosure includes the article according to statement 51, wherein the first storage of the second device includes at least one of the memory of the second device or a persistent memory of the second device.

Statement 54. An embodiment of the disclosure includes the article according to statement 51, wherein determining, by the processor of the first device, the storage type for the data stored on the second device based at least in part on the metadata further includes determining a data address for the data on the first storage of the second device.

Statement 55. An embodiment of the disclosure includes the article according to statement 54, wherein loading, by the processor of the first device, the data from the first storage of the second device includes loading, by the processor of the first device, the data from the data address on the first storage of the second device.

Statement 56. An embodiment of the disclosure includes the article according to statement 46, wherein determining, by the processor of the first device, the storage type for the data stored on the second device based at least in part on the metadata includes determining, by the processor of the first device, that the storage type is a second storage type, wherein the second storage type operates at a second speed that is slower than a first speed of a first storage type.

Statement 57. An embodiment of the disclosure includes the article according to statement 56, wherein accessing, by the processor of the first device, the data from the second device includes reading, by the processor of the first device, the data from a second storage of the second device.

Statement 58. An embodiment of the disclosure includes the article according to statement 57, wherein the second storage of the second device includes at least one of a Solid State Drive (SSD) of the second device or a hard disk drive of the second device.

Statement 59. An embodiment of the disclosure includes the article according to statement 57, wherein reading, by the processor of the first device, the data from the second storage of the second device includes reading, by the processor of the first device, the data from the second storage of the second device without a second processor of the second device performing any operations to support reading, by the processor of the first device, the data from the second storage of the second device.

Statement 60. An embodiment of the disclosure includes the article according to statement 57, wherein reading, by the processor of the first device, the data from the second storage of the second device includes reading, by the processor of the first device, the data from the second storage of the second device using a non-volatile memory express over fabric (NVMeoF) request.

Statement 61. An embodiment of the disclosure includes the article according to statement 57, wherein determining, by the processor of the first device, the storage type for the data stored on the second device based at least in part on the metadata further includes determining a data address for the data on the second storage of the second device.

Statement 62. An embodiment of the disclosure includes the article according to statement 61, wherein reading, by the processor of the first device, the data from the second storage of the second device includes reading, by the processor of the first device, the data from the data address on the second storage of the second device.

Statement 63. An embodiment of the disclosure includes the article according to statement 56, wherein accessing, by the processor of the first device, the data from the second device includes sending a read request for the data to the second device.

Statement 64. An embodiment of the disclosure includes the article according to statement 63, wherein accessing, by the processor of the first device, the data from the second device further includes receiving the data from the second device.

Statement 65. An embodiment of the disclosure includes an article, comprising a non-transitory storage medium, the non-transitory storage medium having stored thereon instructions that, when executed by a device, result in:

determining, by a first processor of a first device, that a second processor of a second device has accessed a metadata from a memory address in a memory of the first device, the second device remote relative to the first device;

determining, by the first processor of the first device, that a data associated with the metadata is currently stored on a first storage of the first device; and copying, by the first processor of the first device, the data from the first storage of the first device into a second storage of the first device.

Statement 66. An embodiment of the disclosure includes the article according to statement 65, wherein:

the first storage includes a second storage type that operates at a first speed; and the second storage includes a first storage type that operates at a second speed, wherein the first speed is slower than the second speed.

Statement 67. An embodiment of the disclosure includes the article according to statement 65, wherein:

the first storage includes at least one of a Solid State Drive (SSD) or a hard disk drive; and the second storage includes at least one of the memory or a persistent memory.

Statement 68. An embodiment of the disclosure includes the article according to statement 65, wherein determining, by the first processor of the first device, that the second processor of the second device has accessed the metadata from the memory address in the memory of the first device includes determining, by the first processor of the first device, that the second processor of the second device has accessed the metadata from the memory address in a hash table in the memory of the first device.

Statement 69. An embodiment of the disclosure includes the article according to statement 65, wherein determining, by the first processor of the first device, that the second processor of the second device has accessed the metadata from the memory address in the memory of the first device includes detecting, by the first processor of the first device, a remote direct memory access (RDMA) of the memory address in the memory of the first device by the second processor of the second device.

Statement 70. An embodiment of the disclosure includes the article according to statement 65, the non-transitory storage medium having stored thereon further instructions that, when executed by the device, result in copying, by the first processor of the first device, a second data from the first storage of the first device into the second storage of the first device.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A system, comprising:

a first device, the first device including a first processor; and a second device, the second device including a second processor, a memory, a first storage that operates at a first speed, and a second storage that operates at a second speed, wherein the second speed is slower than the first speed, wherein the second device is remote relative to the first device, wherein the first device is configured to load a data address and a storage type for a data from a memory address of a hash table stored in the memory of the second device, and wherein the first device is configured to access the data from the second device based at least in part on the data address and the storage type.

2. The system according to claim 1, wherein the first device is further configured to load the data from the first storage of the second device based at least in part on the first storage being of the storage type.

3. The system according to claim 1, wherein the first device is further configured to read the data from the second storage of the second device based at least in part on the second storage being of the storage type.

4. The system according to claim 1, wherein the second device is configured to copy the data from the second storage of the second device to the first storage of the second device based at least in part on the first device loading the data address and the storage type from the memory address of the hash table stored in the memory of the second device.

5. The system according to claim 4, wherein the second device is configured to prefetch a second data from the second storage of the second device to the first storage of the second device based at least in part on the first device loading the data address and the storage type from the memory address of the hash table stored in the memory of the second device.

6. A method, comprising:

loading, by a processor of a first device, a data address and a storage type from a memory address of a hash table stored in a memory of a second device, the second device remote relative to the first device;

identifying a storage of the second device based at least in part on the storage type;

identifying, by the processor of the first device, a storage of the second device based at least in part on the storage type; and accessing, by the processor of the first device, the data from the storage of the second device based at least in part on the data address.

7. The method according to claim 6, wherein identifying, by the processor of the first device, the storage of the second device based at least in part on the metadata storage type includes:

identifying, by the processor of the first device, that the storage type is a first storage type operating at a first speed; and identifying the storage of the second device as operating at the first speed.

8. The method according to claim 7, wherein accessing, by the processor of the first device, the data from the second device based at least in part on the data address includes loading, by the processor of the first device, the data from the storage of the second device based at least in part on the data address.

9. The method according to claim 6, wherein identifying by the processor of the first device, the storage of the second device based at least in part on the metadata storage type includes:

identifying, by the processor of the first device, that the storage type is a second storage type operating at a second speed; and identifying the storage of the second device as operating at the second speed.

10. The method according to claim 9, wherein accessing, by the processor of the first device, the data from the second device based at least in part on the data address includes reading, by the processor of the first device, the data from the storage of the second device based at least in part on the data address.

11. A method, comprising:

detecting, by a first processor of a first device, that a second processor of a second device has accessed a data address and a storage type for a data from a memory address of a hash table stored in a memory of the first device, the second device remote relative to the first device;

determining, by the first processor of the first device, that a data associated with the data address and the storage type is currently stored on a first storage of the first device; and prefetching, by the first processor of the first device, the data from the first storage of the first device into a second storage of the first device based at least in part on detecting that the second processor of the second device has accessed the data address and the storage type from the memory address of the hash table stored in the memory of the first device.

12. The method according to claim 11, wherein detecting, by the first processor of the first device, that the second processor of the second device has accessed the data address and the storage type for the data from the memory address of the hash table stored in the memory of the first device includes detecting, by the first processor of the first device, that the second processor of the second device has accessed the data address and the storage type for the data from the memory address of the hash table stored in a hash table in the memory of the first device.

13. The method according to claim 11, wherein detecting, by the first processor of the first device, that the second processor of the second device has accessed the data address and the storage type for the data from the memory address of the hash table stored in the memory of the first device includes detecting, by the first processor of the first device, a remote direct memory access (RDMA) of the memory address of the hash table stored in the memory of the first device by the second processor of the second device.

14. The method according to claim 11, further comprising prefetching, by the first processor of the first device, a second data from the first storage of the first device into the second storage of the first device based at least in part on detecting that the second processor of the second device has accessed the data address and the storage type from the memory address of the hash table stored in the memory of the first device.

15. The system according to claim 1, wherein at least one of the first storage or the second storage stores a translation layer associating a logical address used by the first device with a physical address used by the at least one of the first storage or the second storage.

16. The system according to claim 1, wherein the first device is further configured to read the data from the second storage of the second device using a non-volatile memory express over fabric (NVMeoF) request.

17. The system according to claim 5, wherein the second device is further configured to update a second memory address of the hash table in the memory of the second device based at least in part on prefetching the second data from the second storage of the second device to the first storage of the second device.

* * * * *